(12) United States Patent
Yamayose

(10) Patent No.: US 9,707,627 B2
(45) Date of Patent: Jul. 18, 2017

(54) RADIUS END MILL

(71) Applicant: KYOCERA Corporation, Kyoto-shi (JP)

(72) Inventor: Tsutomu Yamayose, Satsumasendai (JP)

(73) Assignee: KYOCERA Corporation, Kyoto-shi (JP)

( * ) Notice: Subject to any disclaimer, the term of this patent is extended or adjusted under 35 U.S.C. 154(b) by 258 days.

(21) Appl. No.: 14/368,315

(22) PCT Filed: Dec. 26, 2012

(86) PCT No.: PCT/JP2012/083672
§ 371 (c)(1),
(2) Date: Jun. 24, 2014

(87) PCT Pub. No.: WO2013/099954
PCT Pub. Date: Jul. 4, 2013

(65) Prior Publication Data
US 2014/0341662 A1   Nov. 20, 2014

(30) Foreign Application Priority Data
Dec. 27, 2011   (JP) ................... 2011-285761

(51) Int. Cl.
B23C 5/10   (2006.01)
(52) U.S. Cl.
CPC .......... B23C 5/10 (2013.01); *B23C 2210/045* (2013.01); *B23C 2210/202* (2013.01); *B23C 2210/203* (2013.01); *B23C 2210/40* (2013.01); *B23C 2210/48* (2013.01); *B23C 2210/66* (2013.01); *Y10T 407/1948* (2015.01)

(58) Field of Classification Search
CPC ........ B23C 2210/045; B23C 2210/202; B23C 2210/40; B23C 5/10; B23C 2210/203
See application file for complete search history.

(56) References Cited

U.S. PATENT DOCUMENTS 3,514,828 A * 6/1970 Wale .................. B23C 5/18
                                              407/118
5,855,458 A * 1/1999 Reynolds ............ B23B 51/02
                                              407/34

(Continued)

FOREIGN PATENT DOCUMENTS

JP   2003071626 A   3/2003
JP   2006297495 A   11/2006

(Continued)

OTHER PUBLICATIONS

International Search Report issued in the corresponding PCT application No. PCT/JP2012/083672, dated Mar. 19, 2013, 1 page.

*Primary Examiner* — Sara Addisu

(57) ABSTRACT

A radius end mill includes a corner R cutting edge which extends between the end cutting edge and the outer peripheral cutting edge; and a corner gash disposed adjacent to the corner R cutting edge of the rake face, wherein the corner gash in a planar shape has an edge, part of which is located at the center portion of the corner R cutting edge, and an axial rake at an end portion on the side of the end cutting edge which is in contact with the corner gash on the corner R cutting edge is in the range of 5 to 20 degrees.

8 Claims, 4 Drawing Sheets

(56) References Cited

U.S. PATENT DOCUMENTS

| | | | |
|---|---|---|---|
| 7,402,004 B2* | 7/2008 | Tanaka | B23C 5/10 407/53 |
| 8,807,882 B2* | 8/2014 | Volokh | B23C 5/10 407/53 |
| 8,858,128 B2* | 10/2014 | Budda | B23C 5/1009 407/53 |
| 8,870,498 B2* | 10/2014 | Maeda | 407/53 |
| 9,308,591 B2* | 4/2016 | Volokh | B23C 5/1009 |
| 2011/0268513 A1* | 11/2011 | Takagi | B23C 5/10 407/54 |
| 2012/0183363 A1* | 7/2012 | Davis | B23C 5/10 407/54 |

FOREIGN PATENT DOCUMENTS

| JP | 2008110472 A | 5/2008 |
|---|---|---|
| WO | 2004058438 A1 | 7/2004 |

* cited by examiner

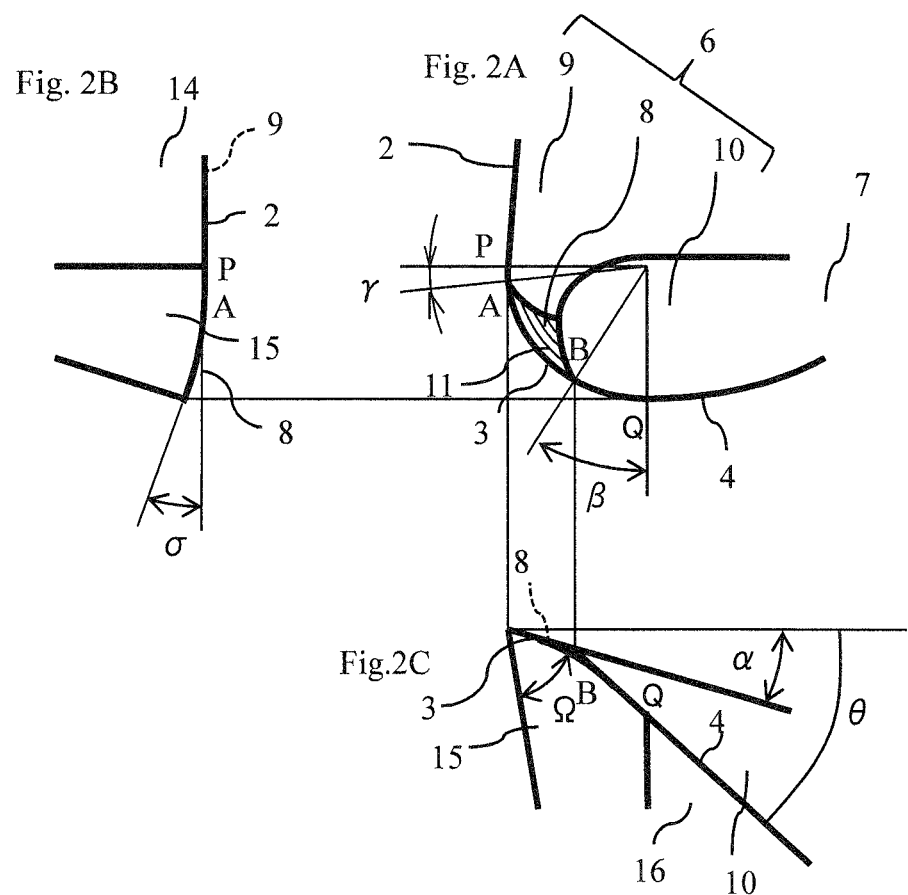

RADIUS END MILL

RELATED APPLICATIONS

The present application is a national stage entry according to 35 U.S.C. §371 of PCT application No.: PCT/JP2012/083672 filed on Dec. 26, 2012, which claims priority from Japanese application No.: 2011-285761 filed on Dec. 27, 2011, and is incorporated herein by reference in its entirety.

TECHNICAL FIELD

The present invention relates to radius end mills which include a corner R cutting edge.

BACKGROUND ART

Radius end mills can provide high efficiency in cutting and are commonly used. For example, PTL 1 discloses a radius end mill which includes a main gash formed at the front end which intersects with an end cutting edge of a chip removal flute and an auxiliary gash face formed in an outside area which intersects from the interface of the end cutting edge of the main gash face and the corner R cutting edge to the outer peripheral cutting edge. Further, PTL 2 discloses a radius end mill which includes a gash extending from an end cutting edge to a corner R edge.

CITATION LIST

Patent Literature

PTL 1: International Publication No. WO 2004/058438
PTL 2: Japanese Unexamined Patent Application Publication No. 2008-110472

SUMMARY OF INVENTION

Technical Problem

However, in the radius end mills disclosed in PTL 1 and PTL 2, there is a problem caused by the gash formed on the corner R cutting edge that a rake angle at a position of the gash is small and a cutting sharpness is degraded. Specifically, although a portion of the corner R cutting edge on the side of the outer peripheral cutting edge is most subject to wear, it is difficult to increase cutting and feeding due to high cutting resistance during a lateral feed machining, which results in a problem that highly efficient processing can not be performed. Further, the end cutting edge is more likely subject to abrasive wear than the outer peripheral cutting edge, and a machined surface of workpiece may often become rough. On the other hand, when a gash is too small, it may cause a problem in that the end cutting edge, the corner R cutting edge and the outer peripheral cutting edge are not smoothly connected and a stepped or edged portion may be formed at the connection between the cutting edges. As a result, chips may be clogged or breakage may occur during cutting operation.

The present invention aims to solve such problems and provides a radius end mill capable of improving a cutting sharpness and preventing a stepped or edged portion which may cause breakage or may interrupt removal of chips from being formed on the cutting edge.

Solution to Problem

The present invention provides a radius end mill including:

a tool body;
a cutting edge composed of an end cutting edge disposed at a front end of the tool body, an outer peripheral cutting edge disposed on an outer periphery of the tool body, and a corner R cutting edge which extends between the end cutting edge and the outer peripheral cutting edge;
a rake face of the end cutting edge, the corner R cutting edge and the outer peripheral cutting edge;
a chip removal flute which extends at the back of the rake face; and
a corner gash disposed adjacent to the corner R cutting edge of the rake face,
wherein the corner gash has an edge, part of which is located on the corner R cutting edge at a position other than an interface of the corner R cutting edge and the end cutting edge and an interface of the corner R cutting edge and the outer peripheral cutting edge, and an axial rake at an end portion on the side of the end cutting edge which is in contact with the corner gash on the corner R cutting edge is in the range of 5 to 20 degrees.

Advantageous Effects of Invention

According to a radius end mill of the present invention, on the corner R cutting edge in the vicinity of the outer peripheral cutting edge, a stepped or edged portion which may cause breakage or chip clogging is prevented from being formed at the connection between the corner R cutting edge and the outer peripheral cutting edge, and a cutting sharpness is improved so that a lateral feed machining can be efficiently performed. Moreover, the axial rake (a rake angle in the axial direction) in the vicinity of the end cutting edge of the corner R cutting edge is small, and a stepped portion is not formed on the rake face so that a flow of chips is not interrupted. Accordingly, it is possible to prevent generation of chipping at the cutting edge and improve the surface roughness on the machined surface.

BRIEF DESCRIPTION OF DRAWINGS

FIGS. 1A and 1B are views which show a four-flute radius end mill which includes four cutting edges, which is one example of radius end mill of the present invention, in which FIG. 1A is a plan view and FIG. 1B is a front view.

FIGS. 2A to 2C are views which show a configuration of cutting edge of the radius end mill of FIGS. 1A and 1B, in which FIG. 2A is a plan view of a rake face taken from above, FIG. 2B is a front view taken from a frank face side of the end cutting edge, and FIG. 2C is a side view of FIG. 2A rotated by 90 degrees (taken from a frank face side of the outer peripheral cutting edge).

DESCRIPTION OF EMBODIMENTS

Figure 1A:
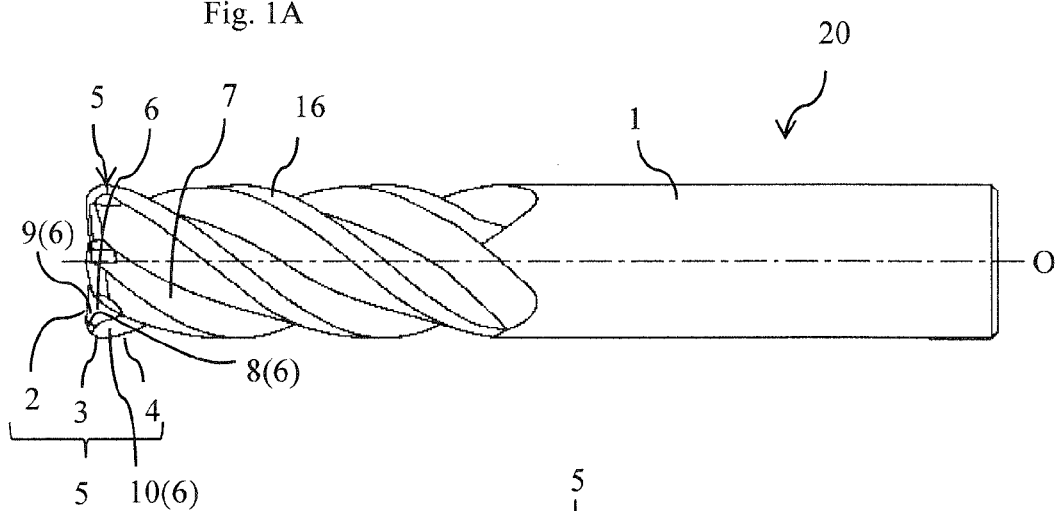
Figure 1B:
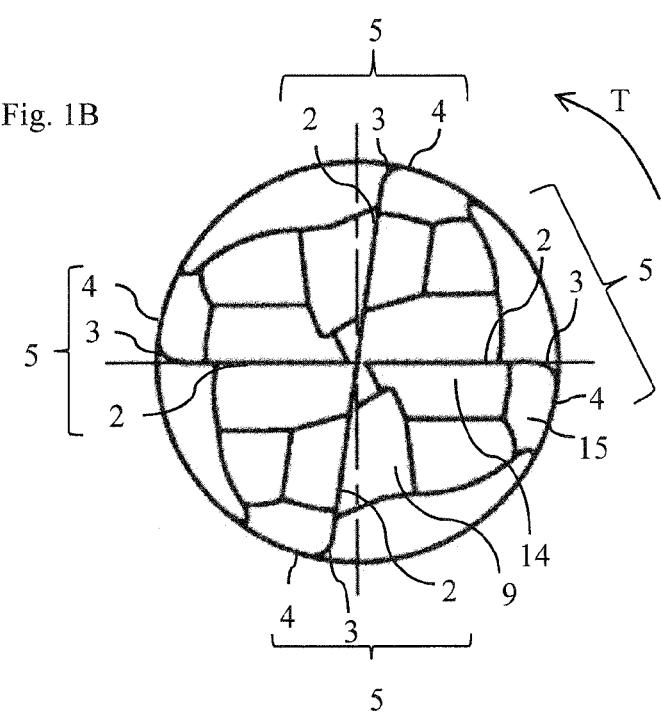

A radius end mill according to the present invention will be described with reference to a preferred embodiment shown in FIGS. 1A, 1B and 2A to 2C.

A radius end mill shown in FIGS. 1A, 1B and 2A to 2C (hereinafter, simply referred to as end mill) 20 is made of a hard material such as cemented carbide and includes a tool body 1 in a substantially cylindrical shape which is rotation symmetry around a center axis O. An end cutting edge 2 is disposed at the front end of the tool body 1 which rotates around the center axis O. An outer peripheral cutting edge 4 is disposed on the outer periphery of the tool body 1. The end cutting edge 2 and the outer peripheral cutting edge 4 are connected by a corner R cutting edge 3 which is disposed therebetween. Further, the end mill 20 includes a series of a plurality of cutting edges 5 composed of the end cutting edge 2—the corner R cutting edge 3—the outer peripheral cutting edge 4 at the front end of the end mill 20.

A rake face 6 is disposed to be continuous with the cutting edge 5, and a chip removal flute 7 extends at the back of the rake face 6. The chip removal flute 7 is disposed on the outer peripheral surface of the tool body 1. The chip removal flute 7 helically twisted from the front end to the rear end in a direction opposite to the rotation direction T in which the end mill 20 rotates during a cutting operation (hereinafter, referred to as reverse rotation direction). Further, an end gash 9 is disposed at the front end of the rake face 6 while forming an angle α relative to the rotation axis O smaller than an angle θ relative to the rotation axis O of the chip removal flute 7. The end gash 9 serves as a rake face of the end cutting edge 2 and also as a chip pocket.

Further, a corner gash 8 is disposed at a position continuous with the corner R cutting edge 3 of the rake face 5. The corner gash 8 is adjacent to the end gash 9.

The corner gash 8 in a planar shape has an edge, part of which is located on the corner R cutting edge (A, B) at a position other than an interface P of the corner R cutting edge 3 and the end cutting edge 2 and an interface Q of the corner R cutting edge 3 and the outer peripheral cutting edge 4. In other words, part of the edge is located in the inner area of the corner R cutting edge 3, and an axial rake at the end portion on the side of the end cutting edge 2 which is in contact with the corner gash 8 on the corner R cutting edge 3 is in the range of 5 to 20 degrees.

That is, the corner gash 8 is disposed on the rake face 6 on the outer side of the end gash 9 and adjacent to the corner R cutting edge 3, and the corner gash 8 is formed as a flat surface or a curved surface which is recessed from the other area of the rake face 6 in the reverse rotation direction. Further, in an end cutting edge end portion A, which is an end portion on the side of the end cutting edge 2 of the edge of the corner gash 8 which is located on the corner R cutting edge 3, an axial rake (a rake angle in the rotation axis direction) α which is a tilt angle relative to the rotation axis O is in the range of 5 to 20 degrees.

The rake face 6 is composed of the end gash 9 which is continuous with the end cutting edge 2, the corner gash 8 which is continuous with the corner R cutting edge 3, and an outer peripheral cutting edge rake face 10 which is continuous with outer peripheral cutting edge 4. The chip removal flute 7 is continuous with the outer peripheral cutting edge rake face 10. Further, an end cutting edge frank face 14 is disposed on the side opposite to the end gash 9 of the end cutting edge 2, a corner R cutting edge frank face 15 is disposed on the side opposite to the corner gash 8 of the corner R cutting edge 3, and an outer peripheral cutting edge frank face 16 is disposed on the side opposite to the outer peripheral cutting edge rake face 10 of the outer peripheral cutting edge 4.

Further, part of the edge of the corner gash 8 is in contact with the corner R cutting edge 3, and the contact area extends on the corner R cutting edge 3 from a position at the inside relative to the interface P of the corner R cutting edge 3 and the end cutting edge 2 to a position at the inside relative to the interface Q of the corner R cutting edge 3 and the outer peripheral cutting edge 4. That is, the corner gash 8 is in contact with an intermediate position of the corner R cutting edge 3 which does not overlap both the interfaces P, Q. In other words, the end cutting edge end portion A, which is part of the edge of the corner gash 8 in contact with the corner R cutting edge 3, is located at a position on the side of the corner R cutting edge 3 with respect to the interface P, and an outer peripheral cutting edge end portion B, which is the other end portion of the edge, is located at a position on the side of the corner R cutting edge 3 with respect to the interface Q.

In this configuration, since the corner gash 8 in the vicinity of the outer peripheral cutting edge end portion B is small, a stepped or edged portion which may cause breakage or chip clogging is less likely to be formed at the connection between the corner R cutting edge 3 and the outer peripheral cutting edge 4. Further, since the axial rake a is in the range of 5 to 20 degrees, a cutting sharpness is improved and a lateral feed machining can be efficiently performed. Further, the rake angle in the vicinity of the end cutting edge end portion A is small. Accordingly, smooth and even connection is provided between the end gash 9 and the corner gash 8 and between the corner gash 8 and the outer peripheral cutting edge rake face 10, and a flow of chips at the rake face 6 is less likely to be interrupted. As a result, a surface roughness on the machined surface of workpiece during cutting operation can be improved. That is, if a stepped portion is formed between the end gash 9 and the corner gash 8 and between the corner gash 8 and the outer peripheral cutting edge rake face 10, chips may be caught by the stepped portion and welded thereto. Further, when the chips are caught, a resistance exerted on the cutting edge 5 (specifically, the corner R cutting edge 3) increases and chipping is generated at the cutting edge 5, and this causes the surface roughness on the machined surface of workpiece to be degraded.

Figure 3A:
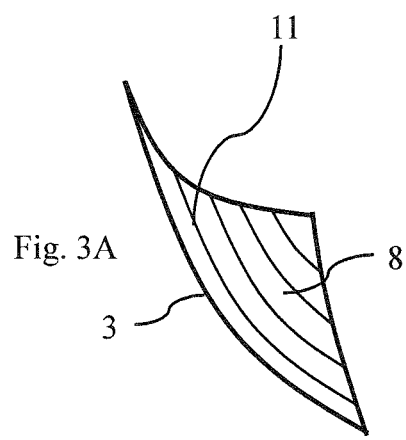
FIGS. 3A and 3B are schematic views which show polishing marks on the corner gash of the radius end mill of FIGS. 1A, 1B and 2A to 2C.
Figure 3B:
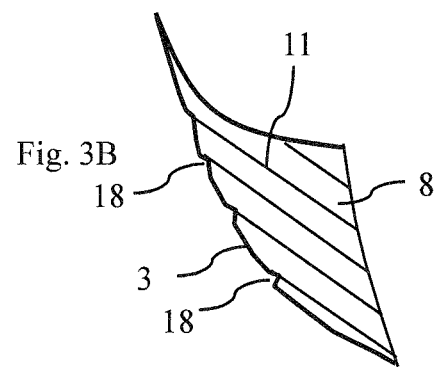

According to this embodiment, since the corner gash 8 is formed by polishing operation, there are polishing marks 11 on the corner gash 8. According to this embodiment, polishing marks 11 are not straight lines and are formed as curved lines which curve in the same direction as that of ridge lines of the corner R cutting edge 3. When polishing of the corner gash 8 is performed in a manner so that the polishing marks 11 are formed in a curved shape as shown in FIG. 3A, chipping can be prevented from being generated at the corner R cutting edge 3 during polishing. For example, if the corner gash 8 is polished by applying a whetstone in a straight manner in a direction inclined 45 degrees to the center axis O, that is, a direction in which the whetstone obliquely crosses the corner R cutting edge 3, the end portions of the polishing marks 11 overlie the corner R cutting edge 3 as shown in FIG. 3B, which may cause serrated stepped portions (chipping) 18 to be formed on the corner R cutting edge 3. On the other hand, when the whetstone is applied in a direction similar to that of the ridge lines of the corner R cutting edge 3, the serrated stepped portions (chipping) 18 can be prevented from being formed on the corner R cutting edge 3 as shown in FIG. 3A. As a result, a surface roughness on the machined surface of workpiece can be improved.

Further, according to this embodiment, the corner gash 8 is a convex surface. This increases a blade tip strength of the corner R cutting edge 3 and prevents chipping of the corner R cutting edge 3. In addition, since the corner gash 8 is a convex surface, a stepped portion is less likely to be formed between the end gash 9 and the corner gash 8 and between the corner gash 8 and the outer peripheral cutting edge rake face 10.

When an angle β formed between a perpendicular line to the corner R cutting edge 3 at the interface Q of the corner R cutting edge 3 and the outer peripheral cutting edge 4 and a perpendicular line to the corner R cutting edge 3 in the outer peripheral cutting edge end portion B which is in contact with the corner gash 8 on the corner R cutting edge 3 is in the range of 30 to 60 degrees, a stepped or edged portion which may cause breakage or chip clogging is prevented from being formed at the connection between the corner R cutting edge 3 and the outer peripheral cutting edge 4 with certainty, and a cutting sharpness is improved so that a lateral feed machining can be efficiently performed. Further, at the rake face 6, a stepped portion is less likely to be formed between the end gash 9 and the corner gash 8 and between the corner gash 8 and the outer peripheral cutting edge rake face 10, and accordingly, a flow of chips can be smoothed and a surface roughness on the machined surface of workpiece can be improved.

Further, a cutting resistance decreases as a recessed angle σ of the corner gash 8 in the reverse rotation direction becomes small. The angle σ can be controlled to a value larger than 0 and smaller than 20 degrees by controlling an angle γ and an angle β to a predetermined angle which will be described later.

When the angle γ formed between the perpendicular line to the corner R cutting edge 3 at the interface P of the corner R cutting edge 3 and the end cutting edge 2 and a perpendicular line to the corner R cutting edge 3 in the end cutting edge 2 end portion A which is in contact with the corner gash 8 on the corner R cutting edge 3 is in the range of 1 to 20 degrees, the rake angle in the vicinity of the end cutting edge 2 of the corner R cutting edge 3 is small and the surface roughness on the machined surface can be improved due to an effect of a wiper.

Further, in order to reduce abrasive wear, the end cutting edge 2 is slightly inclined from the center axis O toward the front end of the end mill 20 in the outer peripheral direction. Further, since the end cutting edge 2 curves at a position which extends from the end cutting edge end portion A to the center axis O, a surface roughness on the machined surface which is cut by the end cutting edge 2 can be improved.

Figure 4:
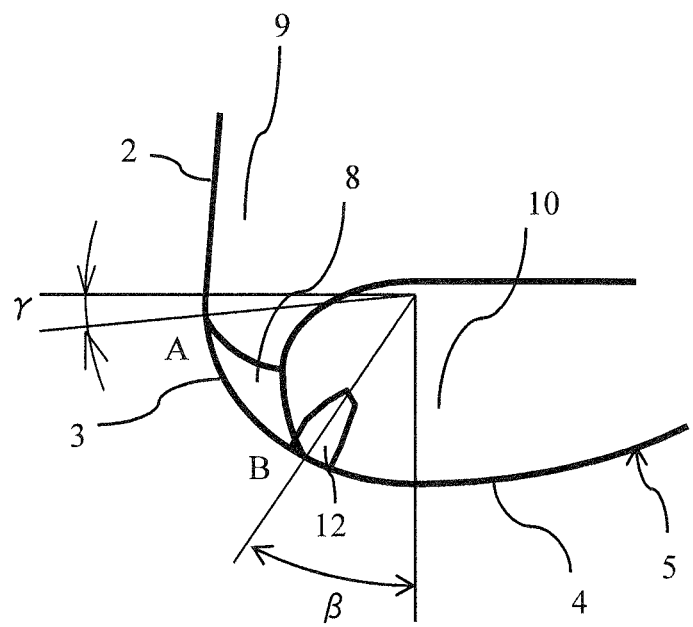
FIG. 4 is a plan view of the rake face taken from above and shows other configurations of cutting edge of the radius end mill of FIGS. 1A, 1B and 2A to 2C.

Further, as shown in FIG. 4, at least one cutting edge of a plurality of cutting edges may include a recess 12 which extends from the outer peripheral cutting edge 4 end portion B which is in contact with the corner gash 8 on the corner R cutting edge 3 to the rake face 6. This prevents a stepped or edged portion which may cause breakage or chip clogging from being formed at the connection between the corner R cutting edge 3 and the outer peripheral cutting edge 4. In addition, since chips can be finely chopped, chips are prevented from being tangled or clogged at the rake face. In this case, in order to improve removal of chips, the recess 12 is preferably formed to extend in the direction perpendicular to the cutting edge of the rake face 6, that is, in the direction perpendicular to the outer peripheral cutting edge 4 end portion which is in contact with the corner gash 8 on the corner R cutting edge 3.

Further, a plurality of recesses 12 according to this embodiment on a plurality of cutting edges 5 of the end mill 1 are arranged such that at least part of the recesses 12 are positioned offset from each other on the respective cutting edges 5. Accordingly, the recesses 12 can eliminate an area which remains uncut on the workpiece. Further, the recesses 12 can also prevent generation of chattering due to sympathetic vibration by altering the balance of cutting resistance exerted on the respective cutting edges 5.

REFERENCE SIGNS LIST

1 tool body
2 end cutting edge
3 corner R cutting edge
4 outer peripheral cutting edge
5 cutting edge
6 rake face
7 chip removal flute
8 corner gash
9 end gash
10 outer peripheral cutting edge rake face
11 polishing marks
12 recess
14 end cutting edge frank face
15 corner R cutting edge frank face
16 outer peripheral cutting edge frank face
20 radius end mill (end mill)
O center axis
A end cutting edge end portion
B outer peripheral cutting edge end portion
α axial rake at the point A (rake angle in the axis direction)

The invention claimed is:

1. A radius end mill comprising:
a tool body;
a cutting edge comprising:
an end cutting edge located at a front end of the tool body, an outer peripheral cutting edge located at an outer periphery of the tool body, and a corner cutting edge located between the end cutting edge and the outer peripheral cutting edge;
a rake surface comprising:
an end gash connected to the end cutting edge, an outer peripheral cutting edge rake surface connected to the outer peripheral cutting edge, and
a corner gash connected to the corner cutting edge and located in a region surrounded by the end gash, the outer peripheral cutting edge rake surface and the corner cutting edge; and
a flute extending from the rake face to a rear end of the tool body; wherein
the corner gash comprises an inner end portion which is located on a side of the end gash and an outer end portion which is located on a side of the outer peripheral cutting edge rake surface,
the inner end portion is away from the end cutting edge and the outer end portion is away from the outer peripheral cutting edge, and an axial rake at the inner end portion is in the range of 5 to 20 degrees.

2. The radius end mill according to claim 1, wherein an angle formed between a perpendicular line to a tangent of the corner cutting edge at the interface of the corner cutting edge and the outer peripheral cutting edge and a perpendicular line to a tangent of the corner cutting edge in the outer end portion which is part of the edge of the corner gash is in the range of 30 to 60 degrees.

3. The radius end mill according to claim 1, wherein an angle formed between a perpendicular line to a tangent of the corner cutting edge at the interface of the corner cutting edge and the end cutting edge and a perpendicular line to a tangent of the corner cutting edge in the inner end portion which is part of the edge of the corner gash is in the range of 1 to 20 degrees.

4. The radius end mill according to claim 1, wherein the end cutting edge curves inwardly from the interface with the corner cutting edge.

5. The radius end mill according to claim 1, comprising a plurality of the cutting edges, wherein at least one cutting edge of the plurality of cutting edges includes a recess that extends from the outer end portion to the rake face.

6. The radius end mill according to claim 5, wherein the recess extends on the rake face in a direction perpendicular to the outer end portion.

7. The radius end mill according to claim 5, wherein the recess is disposed on at least two cutting edges of the plurality of cutting edges, and positions of the recesses on the respective cutting edges are different.

8. The radius end mill according to claim 1, wherein a polishing mark is formed on the corner gash, and the polishing mark is formed in parallel to the corner cutting edge.

\* \* \* \* \*